COMPANDORING TECHNIQUES FOR HIGH-FREQUENCY RADIO CIRCUITS

Filed Dec. 30, 1965

INVENTOR.
JAMES A. STEWART

United States Patent Office 3,377,559
Patented Apr. 9, 1968

3,377,559
COMPANDORING TECHNIQUES FOR HIGH-FREQUENCY RADIO CIRCUITS

James A. Stewart, Redwood City, Calif., assignor, by mesne assignments, to Automatic Electric Laboratories, Inc., Northlake, Ill., a corporation of Delaware
Filed Dec. 30, 1965, Ser. No. 517,692
3 Claims. (Cl. 325—61)

ABSTRACT OF THE DISCLOSURE

High-frequency radio circuits employ compressor and expandor circuits. The carrier is frequency modulated according to the degree of signal compression and then amplitude modulated with the compressed signals to provide a composite wave which carries not only the compressed signals but also an indication of the degree of expansion necessary to restore the compressed signal to its original form. Singing is prevented in one receiver by circuits which utilize the FM signal for controlling a regulator and an expandor, and for inhibiting regulation when the FM signal falls below a preset level.

This invention relates to high-frequency transmission techniques and in particular to techniques for compandoring high-frequency radio transmission circuits whose regulation characteristics have heretofore prohibited the use of compandoring techniques.

The two-way high-frequency radio circuit is an example of voice circuits from which compandors have been excluded. Present radio circuits employ a voice operated gain adjusting device, and a voice operated anti-singing device. The gain adjusting device introduces gain into the transmission path to adjust the signal so that the transmitter modulation index is relatively high for all talkers while the anti-singing device prevents the circuit from singing as a result of the gain introduced and by the variation of the transmission path gain. Among the disadvantages of this type of arrangement are that talking is permitted only in one direction at a time even when separate radio frequency paths are provided, and that much of the talker's speech is clipped each time the direction of conversation is changed.

Compandors have long been used in telephone communication systems as a means of improving transmission. Basically, weaker signal levels are incrceased at the transmitting end of the channel to maintain the weaker signals above the system noise level and then decreased at the receiving end of the channel. The conventional volume compressor performs the analogous function in telephone circuits that the gain adjusting device performs on high-frequency radio circuits, and the volume expandor is analogous to the anti-singing device. Because the expandor gain characteristic is the inverse of the compressor characteristic, the channel gain is nominally constant and there is no need to block one direction of transmission when the other is active. However, the control signal for conventional expandors is derived from the compressed voice signal and consequently, any regulation error in the transmission path is multiplied by the expansion ratio. This effect on high-frequency radio circuits leads to a multiplication of "fade-depth." It is therefore the primary object of this invention to provide new and improved compandoring techniques for high-frequency radio circuits.

It is another object of the invention to provide new and improved techniques of controlling the gain of transmission systems, particularly high-frequency radio systems.

It is a further object of the invention to provide new and improved methods of compandoring high frequency radio circuits.

It is yet another object of the invention to provide new and improved combined signal detection and expandor arrangements for high-frequency radio circuits.

According to one feature of the invention, voice-frequency input signals are volume compressed according to the signal level, a carrier signal is frequency modulated according to the amount of compression, then amplitude modulated in accordance with said compressed signals and transmitted to a receiving station. Reconstruction of the voice-frequency signals is accomplished by detecting the amplitude and frequency variations from the composite signal to obtain the compressed signal and the signal indicative of the amount of compression and expanding the compressed signals under the control of the last-mentioned signal.

These and other objects and features of the invention will become apparent and will be best understood from the following description taken in conjunction with the accompanying drawings.

Figure 1:
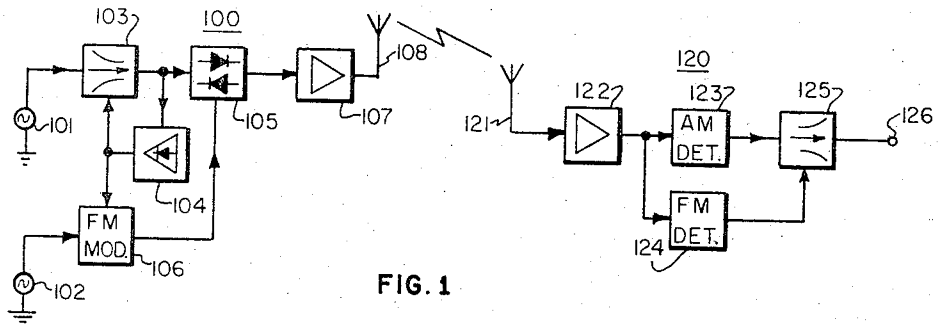
FIG. 1 is a schematic representation of an embodiment of the invention.

The method and apparatus described in FIG. 1 is appropriate for double sideband transmitted carrier systems because the direct current control signal will always be present if the carrier is present to demodulate the AM channel. Consequently, protection against singing is inherent.

Referring to FIG. 1, in the transmitting terminal or station 100, operation of compressor 103 is controlled by a direct current signal derived at control signal circuit 104 from the voice frequency source 101, the voice channel input. The carrier, symbolized by generator 102, is frequency modulated at modulator 106, also under the control of the circuit 104. The frequency-modulated carrier is then amplitude modulated in modulator 105 and fed to the radio transmitter apparatus 107 where it is then coupled to the transmission medium as represented by antenna 108. At the receiving station 120, the receiving antenna 121 passes this dual-modulated signal to the radio receiving circuits 122. Amplitude detector 123 provides, by demodulation, amplitude variations to expandor 125 which is controlled by a varying direct current derived by detecting (demodulating) the frequency variations in circuit 124. The voice signal then appears at output 126.

Figure 2:
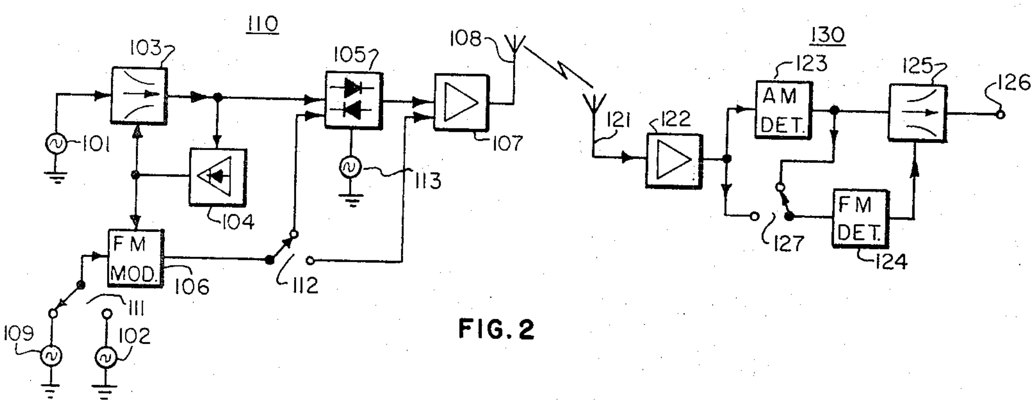
FIG. 2 is a schematic representation of another embodiment of the invention.

Another method of compandoring high-frequency radio circuits is illustrated in FIG. 2 and is applicable to all systems in that the total signal can be confined to the voice frequency band in the event that a sub-carrier is employed. Single sideband high-frequency radio transmitters usually suppress the unwanted sideband by 20 to 30 db and consequently this frequency band is not usable for another voice channel. It can, however, be employed for transmitting on a separate carrier the expandor control signal for a voice channel transmitted over the wanted sideband. Normally, about 3 kc. of bandwidth is available for transmitting the control signal and wide-deviation FM can be used to achieve the necessary signal to noise ratio without appreciably increasing the transmitted load. In this regard, advantage may be gained with a separate phase-locked or frequency-following FM detector, if the FM sub-carrier is arranged to move away from the region of high power spectral density of the unwanted sideband for high level signals.

Referring to FIG. 2, the transmitting station 110 comprises a source of voice frequency 101, the volume range of which is compressed at circuit 103 under the control of a variable direct current signal derived from the control circuit 104, the compressed signal being fed to amplitude modulator 105. In the event that a sub-carrier is employed, switches 111 and 112 in the position shown, symbolically illustrate the path of the sub-carrier. Generator 109 provides a sub-carrier to FM modulator 106 where modulation is controlled by control circuit 104. The frequency-modulated sub-carrier is coupled to the amplitude modulator 105 where the compressed voice frequency signals and the sub-carrier are employed to modulate the carrier of generator 113. The modulated signal is then transmitted to the receiving station 130 by way of radio circuit 107 and antenna 108. At the receiving station, antenna 121 feeds the signal to receiving circuits 122. The amplitude variations are detected by circuit 123 and fed to the expandor circuit 125. If, as in this example, a sub-carrier is employed, the sub-carrier will pass by way of switch 127 to the FM detector circuit 124 where frequency variations will be detected and provided as a direct current signal to control the volume expandor 125. If a sub-carrier is not employed, generator 102 provides the carrier signal via switch 111 in its other position to the FM modulator 106 and in turn via switch 112 in its other position, to the radio circuits 107. At the receiver 130, the carrier is applied to the FM detector via switch 127 in its other position.

The use of a sub-carrier or an independent carrier for transmitting the control signal does not automatically provide protection against singing because the possibility of selective fading exists. The control sub-carrier can be severely attenuated such that the control channel noise controls the voice channel gain with a gain greater than unity being possible. Another method for protecting the voice channel against singing is illustrated by the apparatus of FIG. 3.

Figure 3:
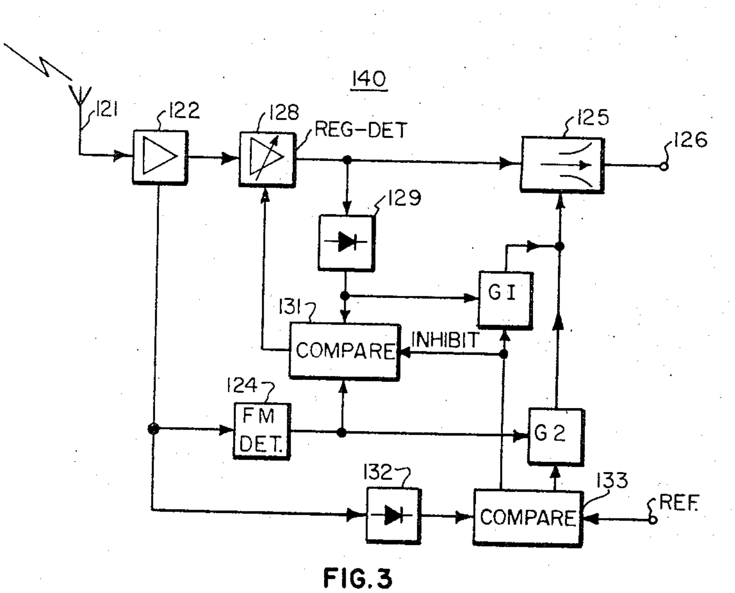
FIG. 3 is a schematic representation of a portion of a receiving terminal in accordance with the principles of the invention.

In FIG. 3, the receiving station 140, expandor 125 is normally controlled by the received FM signal with gate G2 being normally open and gate G1 being normally closed. A regulator (and demodulator) circuit 128 has its control derived via rectifier 129 and comparator circuit 131. The compressed signals derived from the regulator-demodulator circuit are coupled to compandor 125. The FM sub-carrier has its frequency deviations detected at circuit 124 and applied as an input to the comparator circuit 131. The output of the FM detector is also applied as one of the inputs to gate G2. The other input for gate G2 is derived from the FM signal via the rectifier 132 and comparator circuit 133. Gate G2 is normally opened so as to allow a varying direct current from the FM detector circuit to control the expandor, since the received FM signal when rectified at circuit 132 is normally greater than the reference input to the comparator 133. When the FM signal falls below the preset minimum, comparator 133 closes gate G2 and opens gate G1, at the same time inhibiting operation of comparator circuit 131 and also inhibiting regulation in circuit 128. The control of the expandor is now provided from the compressed voice signal via rectifier 129 and gate G1 until the FM carrier is again of a sufficient level to effect opening of gate G2 and closing of gate G1.

Many changes and modifications may be made in the invention by one skilled in the art without departing from the true spirit and scope of the invetnion and should be included in the appended claims.

What is claimed is:

1. Apparatus for compandoring voice-frequency signals in a high-frequency radio link, said apparatus comprising: means for compressing the volume range of the voice-frequency signals; means for deriving from the compressed signals a first control signal for controlling the degree of compression of the voice-frequency signals; a source of carrier; means for frequency modulating the carrier with said first control signal; means for amplitude modulating the frequency-modulated carrier with the compressed voice-frequency signals; means for transmitting the dual-modulated carrier; means for receiving the dual-modulated carrier; means for demodulating the received dual-modulated carrier, said demodulating means comprising an amplitude demodulator, including regulating means, to recover the compressed voice-frequency signals and a frequency demodulator to provide a second control signal related to the first control signal; means connected to said demodulating means for expanding the volume range of the compressed signals under the control of said second control signal; first comparing means connected to said receiving means for comparing the level of said frequency-modulated carrier to a predetermined reference level; means connected to said amplitude demodulator for deriving a third control signal from the demodulated compressed voice-frequency signals; second comparing means connected between said third control signal deriving means and said frequency demodulator and said regulating means operative to compare said second and third control signals to produce a signal for controlling said regulating means; and first gating means connected to said first comparing means and to said frequency demodulator, said first gating means being operated by said first comparing means to connect said second control signal to said expanding means when the level of the received frequency-modulated carrier is greater than said predetermined reference level.

2. Apparatus according to claim 1, and further comprising second gating means connected between said first comparing means and said means for deriving said third control signal and said expanding means, said second gating means being operated by said first comparing means to connect said third control signal to said expanding means for controlling the operation of said expanding means when the level of said frequency-modulated carrier is less than said reference level.

3. Apparatus according to claim 1, wherein said second comparing means is connected to said first comparing means of the operation of said second comparing means being inhibited by said first comparing means when the level of said frequency-modulated carrier is less than said reference level.

References Cited

UNITED STATES PATENTS

| | | | |
|---|---|---|---|
| 2,103,745 | 12/1937 | Frantz et al. | 325—62 X |
| 2,314,707 | 3/1943 | Katzin | 325—61 |
| 2,907,831 | 10/1959 | Jager et al. | 325—50 |

ROBERT L. GRIFFIN, *Primary Examiner.*

JOHN W. CALDWELL, *Examiner.*

B. V. SAFOUREK, *Assistant Examiner.*